Figure 6:
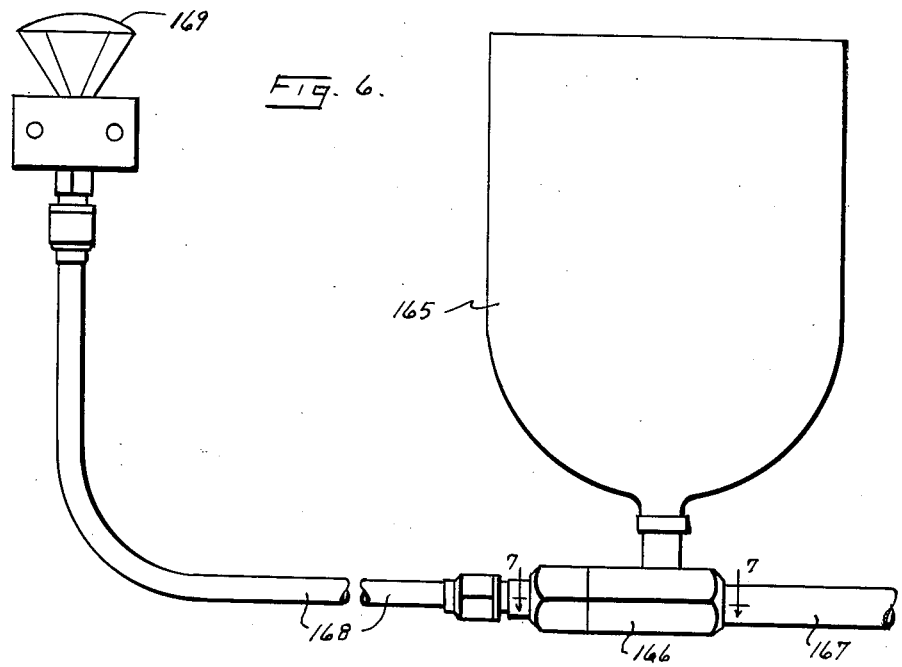

May 8, 1962 J. W. HOWDEN 3,033,726
METHOD FOR BONDING FIBERS TOGETHER
Filed Aug. 22, 1957 3 Sheets-Sheet 1
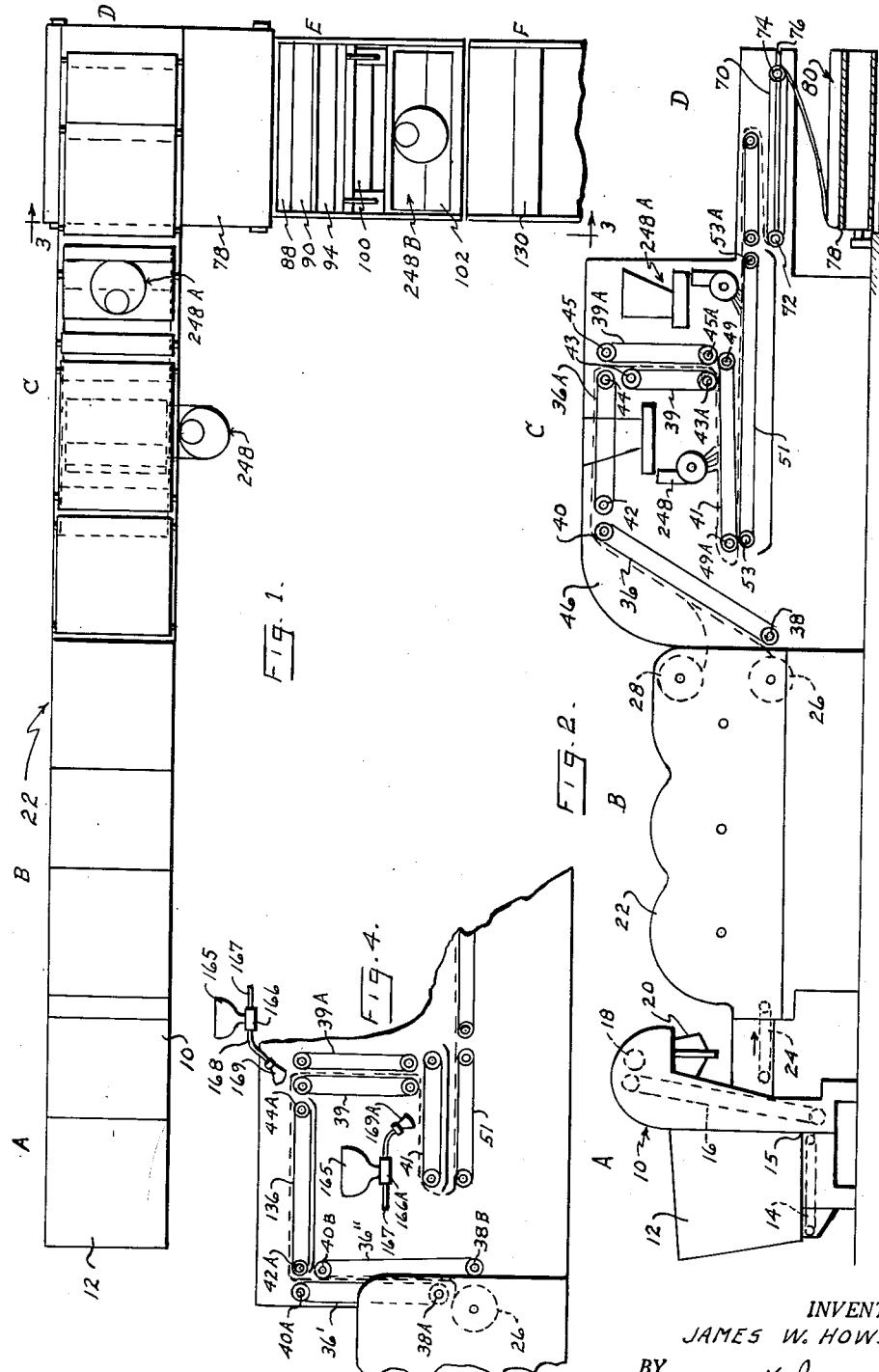
INVENTOR.
JAMES W. HOWDEN
BY
ATTORNEY May 8, 1962 J. W. HOWDEN 3,033,726
METHOD FOR BONDING FIBERS TOGETHER
Filed Aug. 22, 1957 3 Sheets-Sheet 2

Fig. 3.

Fig. 5.

INVENTOR.
JAMES W. HOWDEN
BY Howard J. Jeanbran
ATTORNEY 3,033,726
METHOD FOR BONDING FIBERS TOGETHER
James W. Howden, Ramsey, N.J., assignor to Permex Corporation, New York, N.Y., a corporation of New York
Filed Aug. 22, 1957, Ser. No. 679,708
2 Claims. (Cl. 156—31)

This invention is related to the issued Patent No. 2,671,-496 and the pending application Serial No. 412,682 (Patent No. 2,808,098) filed February 26, 1954 and this invention is particularly useful for bonding together fibers of a type which cannot withstand high temperatures without damage, for example, vegetable and animal fibers, and is especially advantageous for cotton fibers.

One object of the invention is to produce fibrous sheet material, for example, batting material and felt material, comprising fibers bonded together with a powdered thermo-responsive resin as a binder. Such products may be used for a variety of purposes, for example, as upholstery material, packing material, and insulating material, and also for forming other articles. Particular objects of the invention are to produce such materials of high quality, to distribute the resin uniformly throughout the batting to the most effective points, and to minimize the quantity of resin used, consistent with good results.

Performance characteristics of such fibrous materials depend to a considerable extent upon the exact distribution of the resin within the layer of the fibers. The distribution of the resin, in turn, depends upon the manner in which it is introduced into the layer of fibers. An important feature of the present invention relates to the apparatus and method for introducing the resin into the layer. Since resin is a relatively expensive item of the components of the product, optimum distribution of the resin produces optimum quality and economy.

It has been found that a substantially improved product may be made in accordance with present invention, which insures a degree of uniformity in the distribution of the resin in the layer of fibers by introducing the resin from both sides of the layer, before it is crosslapped and trim one side or trim both sides after it has been crosslapped.

In another embodiment of the invention, the fibers are first arranged as a layers and advanced on a continuously moving conveyor. For applying the resin, there is provided a generally cylindrical rotor, or impeller, having a serrated outer turface defining resin-impelling surfaces. The outer surface may, for example, include teeth, grooves, or vanes which impel a stream of the resin mixed with air toward the fibers, in a manner to be described. The rotor preferably rotates on a horizontal axis. A shield closely embraces the rotor and has an inlet slot in its upper half, and a discharge slot in its lower half. The inlet slot is located in the 90° quadrant through which a given point of the rotor passes after passing the top. Connected to the inlet slot and extending upwardly therefrom is an inlet chute to prevent air currents from causing excessive disturbance in the resin flow. A resin feeding device, such as a vibratory feeder pan, supplies powdered thermo-responsive resin, for example, a vinyl resin, to the inlet chute, which in turn supplies it to the rotor. The rotor rotates continuously at high speed, and serves to discharge resin and air or other suitable gaseous medium from the discharge slot of the shield. A layer of fibers advances below the discharge slot, and the stream of resin and air from the rotor strikes the advancing layer of fibers and produces a uniform and very effective distribution of the resin within the layer of fibers. The resin within the layer is thereafter heated, so as to activate it and cause it to bond the fibers together, and the bond is set when the layer leaves the heating zone due to normal cooling.

Since the method described herein is in fact similar to the prior patents except that the procedure in Zone C, E and Zone F have been changed and the treatment thereafter may or may not be followed, this application is primarily an improvement over the prior application and is limited to the impregnation from both sides of the layer, before crosslapping this double impregnation produces a positive bond when the layers are lapped as in section D to produce the build up of layers in forming a pad of substantial thickness.

In one embodiment of the invention, the fibers, of cotton for example, are first arranged as a layer on a continuously-advancing belt. In one instance dry powdered thermoplastic resin, for example, a copolymer of vinyl acetate and vinyl chloride, is distributed or impelled into both faces of the advancing layer of fibers. The resin penetrates into the interior of the layer. The fibers and the incorporated powdered resin are then cross-lapped onto a moving apron or belt advancing in a direction transverse with respect to that in which the first-mentioned belt moves. In this manner there is built up a fluffy composite mass, including a plurality of layers of cotton fibers with powdered resin uniformly distributed throughout. The fluffy composite mass is then passed through pressure rolls, which loosely compact it so as to decrease its thickness. It then advances through a heating zone, where the temperature of the powdered resin is raised to the softening point. Under this condition the powdered, thermoplastic resin becomes fluid, a hot air blast from both sides of the composite mass is next utilized to insure a good distribution and penetration of the liquid resin, as the composite mass moves through zone G it becomes tacky and causes the fibers to adhere to one another. In the heating zone F the mass may be further compacted. It is then passed through a series of cooling rollers in zone G with its upper and lower surfaces preferably held parallel. The cooling while passing through the rollers will set the resin thereby forming the desired batting.

Figure 7:
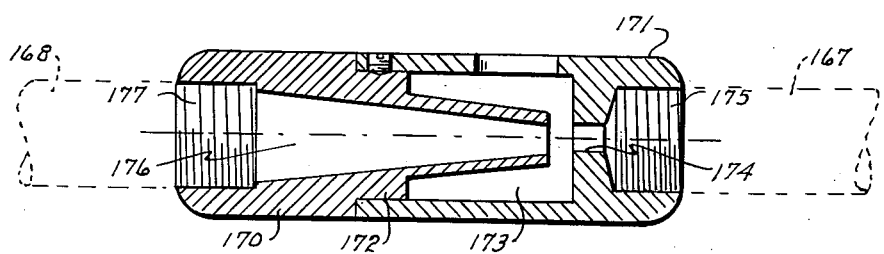

The above mentioned features together with many advantages apparent in the practice of the present invention will be readily comprehended by reference to the following detailed description and the drawings in which:

FIG. 1 is a plan view of the apparatus utilized to perform the method disclosed, FIG. 2 is a view in side elevation of the apparatus illustrated in FIG. 1, FIG. 3 is a side elevational view taken on line 3—3 of FIG. 1, FIG. 4 is a further embodiment of station C of the apparatus illustrated in FIGS. 1 and 2, FIG. 5 is a side elevational view partially in vertical section of an impeller used in conjunction with FIGS. 1 and 2, FIG. 6 is a further embodiment of this invention illustrating alternating means of distributing the powdered resin, and FIG. 7 is a cross sectional view of the venturi taken on line 7—7 of FIG. 6.

It will be understood that the various figures are, in general, schematic in nature.

Referring to FIG. 1, it may be generally explained that fibers, or material from which fibers may be derived as by shredding, are introduced in station A, and are advanced progressively through the apparatus from left to right past station B, where they are arranged as a layer, past station C, where a powdered resin is introduced; to station D, where the fibers are arranged as a plurality of layers, the resin being uniformly distributed throughout the fibers. From station D the composite mass advances in a direction transverse to its original path, past station E, where it is compacted somewhat and its edges trimmed, past station F, where it is heated and also slightly compacted, past station G, where it is cooled, and it emerges from the apparatus at station H as batting.

In FIGS. 1 and 2 there is shown a feeder, generally indicated at 10, including a bin 12. Fibers are fed into this bin. These fibers may be in the form of raw cotton, cotton sweepings, textiles, fibers of various types including those mentioned previously herein, or a mixture of various substances. One suitable substance comprises a mixture of American long staple cotton, India cotton, and American reworked waste. As a variation, there may also be introduced, into the bin, material which has previously passed through the apparatus of the present invention.

At the bottom of the bin 12 there is an advancing spiked belt 14. Masses of fibers are picked up by the spiked belt 14 and are advanced thereby through a limiting gate at 15, being transferred to another spiked belt 16 and carried upwardly thereby.

From the spiked belt 16 the fibers progress past a beater 18, falling into a hopper 20. Means not shown are provided for opening the hopper 20 at periodic intervals and thereby feeding batches of fibers downwardly onto a spiked belt 24. The spiked belt 24 carries the fibers into apparatus 22 which is adapted to arrange the fibers in a substantially uniform layer, with the fibers lying approximiately parallel to one another and parallel to their direction of advance. For performing this operation, and also for performing the cross-lapping operation to be described, there may be employed apparatus similar to a garnetting machine, for example, a three-cylinder twin doffer garnet.

In FIGS. 1 and 2, the apparatus schematically shown and designated as 22 comprises a portion of such a garnetting machine. Its two doffer rolls are indicated as 26 and 28. A layer of cotton fibers emerges from each of these two doffer rolls, being combed therefrom by combing means not shown. These two layers of fibers are combined on an advancing belt or apron 36 as a single layer. The belt or apron 36 is of slotted construction. It may, as a variation, be of other types of perforated construction. The belt 36 is carried by rollers 38, 40. The belt is mounted in such a position that it will carry the layers upward as shown in FIG. 2. These last-mentioned rollers are carried by shafts journaled in a stationary frame 46. The two layers of fibers pass from belt 36 to a belt 36A (of the same construction) mounted on rollers 42 and 44, this belt being positioned in a horizontal relationship with one end adjacent to belt 36. The two layers of fibers that have by now become a single layer will pass from the belt 36A in a downward direction between two endless belts 39 and 39A (which is of the same construction) that are rotated in opposite directions. Belt 39 is mounted on rollers 43 and 43A. Belt 39A is mounted on rollers 45 and 45A. The adjoining faces of belts 39 and 39A will grasp the fiber layer and move downward at the same rate or speed and feed the fiber layer onto an endless belt 41 (also the same construction) that is mounted on rollers 49 and 49A and moved in a direction away from the end of both belts 39 and 39A. Belt 41 is positioned in a relatively horizontal plane. The fiber layer that leaves or is fed from belt 41 will in turn drop or pass to a lower endless belt 51 (also the same construction) and due to its movement in an opposite direction to the feed of belt 41, the fiber layer will in effect be turned over and carried away by belt 51. Belt 51 is in turn supported by rollers 53 and 53A. The belts are all operated at the same speed and comprised of slotted or perforated construction so that there is a continuous feed of the fiber layer without effecting any stretching. All of the rollers mentioned are carried by shafts journalled in a stationary frame 46.

As shown in FIG. 2, the layer of cotton fibers is next transferred from the belt 51 to a cross-lapper or reciprocating apron comprising a belt 70 carried by rollers 72 and 74. These rollers are in turn carried by a movable frame, not shown, which reciprocates in a slot 76 in the frame 46.

The layer of cotton fibers is, because of the reciprocating motion of the movable frame, cross-lapped onto a floor apron or belt 78 (also of the same construction), as a composite, multiple-layered mass 80. The floor apron 78 advances in a horizontal direction, at right angles to the previous horizontal direction of advance of the cotton layer. This arrangement may be readily observed in FIG. 1. It is this arrangement which causes the cross-lapping of the layers onto the floor apron 78.

For the sake of clarity in FIGS. 1 and 2 of the drawings, the layer of cotton fibers is shown only at the point where it is cross-lapped onto the floor apron 78 in FIG. 2, being omitted at other points since it is believed that its inclusion would tend to be confusing.

FIG. 3 may now be considered, in connection with FIG. 1. The floor apron or belt 78 is carried by rollers 84 and 86, which rotate on stationary axes. The multiple-layered mass of cotton with the resin distributed therethrough is advanced by the floor apron 78 and then passes through a series of compression rolls 88, 90, 92, 94 and 96, which compact it somewhat. It then passes through vertical rotary cutters 98 and a backing roller 100, which trim its edges, or may be arranged to divide it longitudinally into strips or narrower layers.

The cotton strips or layers are then advanced by a belt 102 (also of the same construction) to a pair or plurality of pairs of heating rollers 122 and 114. In the prior application above mentioned the cotton strips or layers were heated by means of hot air blown from either side of the strip at a low velocity primarily to change the powdered thermo-plastic resin into a fluid or semi-fluid state where it would coalesce with the fibers and where a certain degree of capillary action happens. Thus although the distribution of the powdered thermoplastic was actually performed in zone C, FIG. 1 the bonding of the fibers is performed in zone F and G. In this application which is similar except that the cotton strip is permeated with powdered thermoplastic resin from the top and the bottom surfaces, this double impregnation is performed not only to insure a thorough distribution of the resin into the cotton strips or layers but in addition provides an abundance of the powdered thermoplastic resin on each surface so that when the strips or layers pass through the heating rolls and enter between a plurality of hot air jets, the velocity of the air is very carefully controlled as in this instance the hot air is not provided to melt or reduce the powdered resin to a coalescing state but in fact the hot air is introduced to carry the liquid or semi-liquid form of resin inward throughout the fibers of the strip or layer, the velocity of the hot air depending upon the thickness of the strips or layers passing through the device. In the event it is a thin web naturally the air velocity may be quite low to give a thorough distribution. Whereas with an exceptionally thick web, the velocity must be increased considerably to insure the distribution of the resin through the pad or web. It is to be noted that the hot air jets are not positioned in opposition to each other as this would create a disturbance in air flow. Instead the hot air jets are staggered so that the jets will blow from one side of the web at a time, thus carrying the molten or coalescing resin upward into the web in one instance and downward into the web in another instance. It is to be further noted that unlike the prior application after the web has been treated by the hot rollers and hot air blasts, the web will then pass immediately between the cooling rollers 126 and 116 which may be a single pair or a plurality of pairs according to the degree of compression and extent of cooling required. It is to be noted that as the cotton strips or layers leave the belt 102 they are picked up by a pair of belts 110 and 112 (of the same construction) which pass around the heating rollers 114 and 122. These belts running at the same speed provide the means of carrying the strips or layers through zones F and G. As the strips or layers pass through the heating rollers 114 and 122 the web becomes heated to a degree sufficient to change the powdered resin into a liquid or semi-liquid state. Although a single pair of heating rollers are shown it is to be understood that a plurality of pairs of heating rollers may be used depending upon the thickness of the web and the amount of heat required to change the powdered resin into the liquid or semi-liquid state. As the web leaves the heating rollers 114 and 122, it will pass over a plurality of hot air jets 134 and moving further through zone F will pass under a plurality of hot air jets 140. The hot air jets 134 and 140 are controlled by valves 132 so that the velocity of the air may be regulated according to the thickness of the web carried by the belts 110 and 112. The strips or layers are advanced further passing through a pair or plurality of pairs of cooling rollers 126 and 116. The strips or layers while passing through the cooling rollers will be reduced to the desired compression and therefore thickness of the finished layer as the resin sets. Thus a uniform thickness of material will be extruded from the last pair of rollers 126 and 116.

Referring back to FIGS. 1 and 2 although we have described the formation of two layers of cotton being combined and carried forward as a single layer through the apparatus illustrated in FIGS. 1, 2, and 3 it is to be noted that the layer of cotton while being carried by belt 41 is subjected to a distribution of the dry powdered thermoplastic resin. This resin is properly distributed and impelled into the cotton layer by means of an impeller 248 mounted in proper spaced relation above the advancing cotton layer. It is to be noted that the dry thermoplastic resin is thus introduced to one surface of the cotton layer. As the cotton layer continues progressing from belt 41 to belt 51, the cotton layer is inverted and thus the opposite face of the cotton layer is then presented to a second impeller 248A which in turn properly distributes and impels the resin into the cotton layer. Thus the cotton layer is thoroughly coated and saturated from both sides with the dry thermo-plastic resin. The cotton layer is next crosslapped at station "D" and advanced to station "E" the multiple layered batting is again subjected to an impregnation of dry powdered resin by the impeller 248B.

Referring to FIG. 4 there is illustrated a further embodiment of this invention which in effect is an alternate form of the device illustrated at station "C" of Figs. 1 and 2. In this instance a single cotton layer is fed from the doffer roll 26 and is fed between two endless belts 36' and 36" which are rotating in opposite directions and at the same speed so that the adjacent belts will grasp the cotton layer and carry it upward as illustrated in FIG. 4. Belt 36' is supported on a pair of rollers 38A and 40A while belt 36" is supported on a pair of rollers 38B and 40B. The cotton layer issuing from the top of the belts 36' and 36" falls upon an endless belt 136. Belt 136 is supported by a pair of rollers 42A and 44A. The cotton layer in turn is fed between a pair of endless belts 39 and 39A similar to the apparatus shown in FIG. 2 and the cotton layer in turn issues onto an endless belt 41 and from belt 41 it is inverted and carried on belt 51 and from belt 51 it is carried forward in a similar fashion to that described in FIGS. 1 and 2. It is to be noted that a venturi 166 and its spray nozzle 169 are positioned above belt 136 to thus provide a distribution of the dry thermoplastic resin onto and into the advancing cotton layer. It is to be further noted that when the cotton layer has progressed downward and has been inverted, a second venturi 166A and its spray nozzle 169A is positioned adjacent the untreated surface of the cotton layer above belt 41 to similarly distribute a dry thermoplastic resin onto and into the advancing cotton layer. It is to be noted that the spray nozzles 169 and 169A may also be positioned in directly opposed positions at any point where the web leaves one belt and is picked up by another belt, in this instance the powder is sprayed into the web and may permeate to the degree that some particles sprayed from one side will impinge with particles sprayed from the opposite side. Thus the cotton layer that has passed through the apparatus at station "C" according to this embodiment is similarly impregnated from both sides of the cotton layer to insure a thorough distribution of the resin throughout the cotton layer. In addition a nozzle 169B may be added to the underside of the crosslapped batting at station "E" of FIG. 3. This is provided to implement the method of multiple impregnation thus batting may be produced that is soft and fluffy throughout but the finished batting may be provided with a stronger exterior surface, and of course either surface or both surfaces may be so treated.

Referring to FIG. 5 there is illustrated an impeller 248, the impeller 248 is primarily a generally cylindrical rotor 248' serrated in cross section so as to define resin impelling surfaces such as 249. The rotor 248' is serrated by having in its surface a series of grooves parallel to the axis of the rotor, the shape of the grooves being semi-circular areas. The general cross section of the rotor may be in the shape of a gear. There is provided a shield 252 which embraces the rotor and fits closely around its periphery. The shield 252 has a discharge slot 256 and an inlet slot 254, both slots extend parallel to the axis of the rotor. The inlet slot 254 is positioned in the upper half of the shield while the discharge slot 256 is positioned in the lower half. A tapered chute 258 extends upwardly from the inlet slot 254. This is provided for feeding the powdered resin to the rotor and for controlling the air currents in the region of the inlet slot. There is also provided a feeder pan 260. The feeder pan 260 is provided with a small outlet opening which is positioned above the chute 258. The feeder pan 260 is supported and carried by a vibrating table 261, the table being supported by springs 262 and a vibrating drive 263 both mounted on a frame 264. A stationary hopper 265 is positioned above the feeder pan 260 and normally holds a quantity of powdered resin binder. The hopper has an opening at the bottom through which resin feeds into and upon the feeder pan 260. This opening may be for example about ½" above the bottom of the feeder pan. There is also provided a baffle plate 265' that is attached to the shield 252 immediately in front of the discharge slot 256. The baffle extends across the complete discharge plane or area of the shield and downward approximately 2" from the outside of the shield. The baffle plate 265' at its outer unattached end is formed with a curve common to the direction of travel of the belt 51A or apron passing thereunder. This baffle prevents eddy currents around the shield and thus allows the resin particles to be delivered to the fiber layer from the discharge opening 256 with a high velocity. In operation the feeder pan is continuously vibrated by the drive 263 and the table 261 to thus cause the resin to be fed steadily from the pan into the chute and the impeller 248' is continuously rotated to thus continuously impel the particles of resin from the outlet opening 256 in a pattern generally as illustrated by the dotted lines in FIG. 5. It is to be noted that because of the rotation of rotor 248' there is a downward movement of air in the chute 258 thus the rotor tends to suck air into the inlet slot with the powdered resin. This arrangement causes an injection action that is, causes air from the chute to be entrained and carried along by the teeth or grooves of the rotor and in turn discharges the air and particles of resin partly by the centrifugal action and in addition through the entrained air to impel the powdered particles downwardly in a direction which is opposed to the direction of movement of the layer of fibers underneath the discharge slot. Thus the resin particles strike and pass into the layer of fibers.

Referring to FIG. 6 there is illustrated an alternate distributing means for the powdered resin which includes a hopper 165, a venturi 166, an air supply line 167, a discharge line 168 and a spray nozzle 169. The venturi 166 is illustrated in FIG. 7 and comprises a two piece shell 170 and 171. The two portions are formed in a fashion so that they may be readily joined as illustrated in FIG. 7 either by threading together or with a set screw as illustrated. As shown in FIG. 7 the portion 170 is provided with a reduced shoulder 172 to permit the portion 171 to slip over the shoulder 172 and be retained as already described. The portion 171 is provided with a large internal bore at one end thereof which forms a chamber 173 when the two portions are joined as described. The closed end of chamber 173 is provided with an orifice 174 of a predetermined size, the orifice in turn opening into an inlet bore 175, the bore 175 being threaded to receive the intake air line 167. Portion 170 is provided with a cone shaped bore 176 that extends from an outlet port 177 to a point spaced from but adjacent to the orifice 174. This forms the venturi core. The distance between the orifice and the end of this cone shaped bore forms a gap which must be of a predetermined size depending upon the air velocity and the powder particles. Likewise the size of the opening or inlet of the cone shaped venturi core must be carefully designed so that it is slightly in excess of the orifice. With the venturi as illustrated in FIGS. 4, 6 and 7 the inlet air line 167 is attached to the inlet port 175 while the outlet line 168 is attached to the outlet port 177. In operation with a pressure of from 1 to 10 lbs. air and with a powdered resin in which the particles are from 3 microns to .010" it is apparent that the venturi action created by the air passing through orifice 174 will produce sufficient suction to carry the resin particles through the venturi core and discharge the air and resin particles through line 168 and out the discharge nozzle 169. The device as described may be positioned in FIGS. 4, 1 and 2 to replace the impeller 248 and thus provide a similar distribution of the resin particles into the cotton web as already described.

In both the patent aforementioned and the pending application mentioned the method comprises arranging fibers in an advancing layer and applying dry powdered thermo-plastic resin to the one side of the layer then cross-lapping this layer to form a multiple layered batting of fibers with resin distributed therethrough and subsequently heating this batting until the resin has reached its softening point a point at which a hot air blast will produce a running or dispersion of the resin along the fibers and subsequently cooling the resin to cause it to coalesce while maintaining the batting under a desired pressure to thus set all fibers with relation to each other in the batting at approximately the density desired. In this application the method is similar except that in addition to applying the resin to one surface of the advancing layer, the layer is reversed and the resin is applied to the opposite side to impel a distribution of the resin throughout the layer thus providing a double impregnation before the cross-lapping takes place. This insures a uniform distribution of the dry powdered thermo-plastic resin through the batting and a thorough distribution of the resin along the fibers after it is melted, to give a uniform bonding throughout the batting. In addition to the use of a thermo-plastic resin as described throughout this application, a thermo-setting resin may be used to obtain a similar result. However, in this instance the batting as finally set is a product that can no longer be changed in its form or density.

In a further embodiment of this invention, the method will comprise applying dry powdered thermo-plastic resin to one side of the cross lapped layers or laminations of fibers at the region E of FIGURE 3 which is prior to the entry of the laminations or layers between rolls 114 and 122. If the resin is applied to the top surface only then as the layers pass through region F the thermo-plastic becomes heated to a degree sufficient to change the powdered resin into a liquid or semi-liquid state. The hot air jets 134 are not necessary in this embodiment but the hot air jets 140 are utilized to induce an impregnation of the laminations, that is, the liquid resin will be forced downward along each and every fiber by the hot air blast and thus cause the liquid resin to penetrate deeply into the layers or laminations. The strip will continue through zones G and H, being cooled and set as in the prior embodiment. In this embodiment the additional dispersion of resin and impregnation from one side will provide a strip or layer having at least one side that is reinforced, thus being more resistant to abrasion and having a greater tensile strength than the untreated side, and it may be made impervious to liquids.

In a still further embodiment of this invention, the method will comprise applying dry powdered thermoplastic resin to both sides of the cross lapped layers or laminations of fibers at the region E of FIGURE 3 which is prior to the entry of the laminations or layers between rolls 114 and 123. Since the resin is applied to both surfaces of the layer, the air jets 134 and 140 will be utilized, that is, as the layer passes over the jets 134, the hot air blast upward through the belt will cause the liquid resin to flow upward along the fibers to provide a penetration into the laminations or layers. Likewise, as the layer passes under the hot air jets 140, the air blast downward will induce a flow of the liquid resin along the fibers to produce a penetration through the laminations. In this embodiment the additional dispersion of resin and impregnation from both sides will provide a strip or layer having both sides that are reinforced, thus being more resistant to abrasion and having a greater tensile strength.

It is apparent that when the fibrous layer is cut into strips in zone E that the impregnation of thermoplastic resin to either one surface or to both surfaces will in addition penetrate the cut areas and give a reinforcement to the edges of the strips. To prevent the adjacent edges from adhering the strips are spread as they are fed through zones F, G and H.

It is apparent that various changes may be made to the apparatus as disclosed without departing from the method described herein as long as a continuous layer of fibers is to be treated and is treated on both sides thereof to provide a double impregnation. It is to be understood that various changes may be made in the form of the impeller or in the manner in which the cotton fibrous layer is carried into various positions for impregnation or in the manner of producing capillary action along the fibers or in producing a forced dispersion of the liquid resin without departing from the spirit of this invention and this invention shall be limited only by the appended claims.

What is claimed is:

1. A method of forming batting, comprising applying fibrous material, at least a major portion of which consists of cotton fibers, as a thin layer on an advancing flexible, perforated carrier belt, with said fibers oriented predominantly lengthwise of said belt, mixing a dry, powdered, thermoplastic vinyl resin with air and directing a stream of the resulting mixture into said layer, from both sides of said layer, through the exposed faces thereof, at a station where said layer is supported and advanced by said perforated carrier belt, so as to distribute said resin throughout said layer, said resin being non-tacky at room temperature but having a softening temperature below the charring temperature of cotton, removing said layer from said carrier belt and cross-lapping it with said resin therein onto another advancing carrier belt to form a fluffy, composite batting, loosely compacting said batting with the aid of rollers to reduce its thickness somewhat while said resin is in a non-tacky condition, cutting said layer into strips and applying a powdered thermoplastic resin to both sides and the edges of said strips, thereafter advancing said strips between converging perforated belts, to reduce their thickness gradually and progressively as they advance through a compacting and heating zone while progressively heating them by blowing a hot gas into both faces and the edges at successive stations, whereby to heat said batting to a temperature high enough to render said resin soft and tacky but not high enough to char said cotton fibers, and whereby to cause said resin to bond said fibers together at many of their crossing points, and thereafter advancing said strips between approximately parallel perforated belts to cool and set said resin therein, while maintaining said strips in a compressed condition.

2. A method of forming strips of reinforced batting, comprising impregnating with a powdered thermoplastic resin a mass of loose fibrous material the majority of which consists of non-thermoplastic fibers to form a mass of composite material, said mass of composite material including individual aggregates each comprising thermoplastic resin and non-thermoplastic material, intimately combining said mass of composite material with cotton fibers and forming a relatively thin advancing layer comprising said mass of composite material and cotton fibers, cross-lapping said advancing layer to form a thicker layer, gradually compressing said thicker layer, cutting said layer into strips and applying a powdered thermoplastic resin to both sides and the edges of said strips, blowing hot air through said strips and then cooling said strips so as first to soften and then to set the thermoplastic resin therein and thereon to bond said cotton fibers together.

References Cited in the file of this patent

UNITED STATES PATENTS

| | | |
|---|---|---|
| 2,357,042 | Coss et al. | Aug. 29, 1944 |
| 2,372,433 | Koon | Mar. 27, 1945 |
| 2,550,465 | Gorski | Apr. 24, 1951 |
| 2,671,496 | Chavannes et al. | Mar. 9, 1954 |
| 2,736,362 | Slayter et al. | Feb. 28, 1956 |
| 2,746,894 | Orser et al. | May 22, 1956 |
| 2,758,630 | Hodge | Aug. 14, 1956 |